April 13, 1965 B. EDWARDS 3,178,051
CONTAINER AND LID
Filed Sept. 26, 1962 3 Sheets-Sheet 1
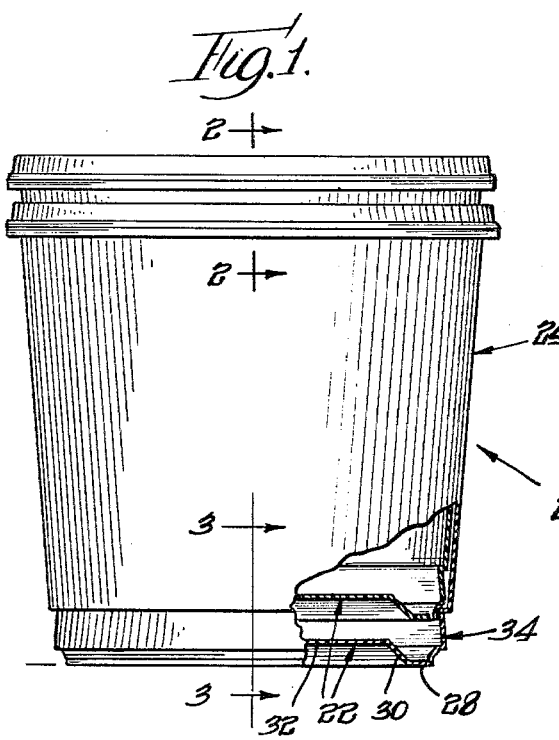
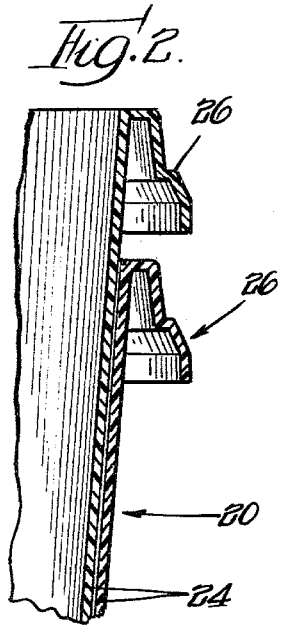
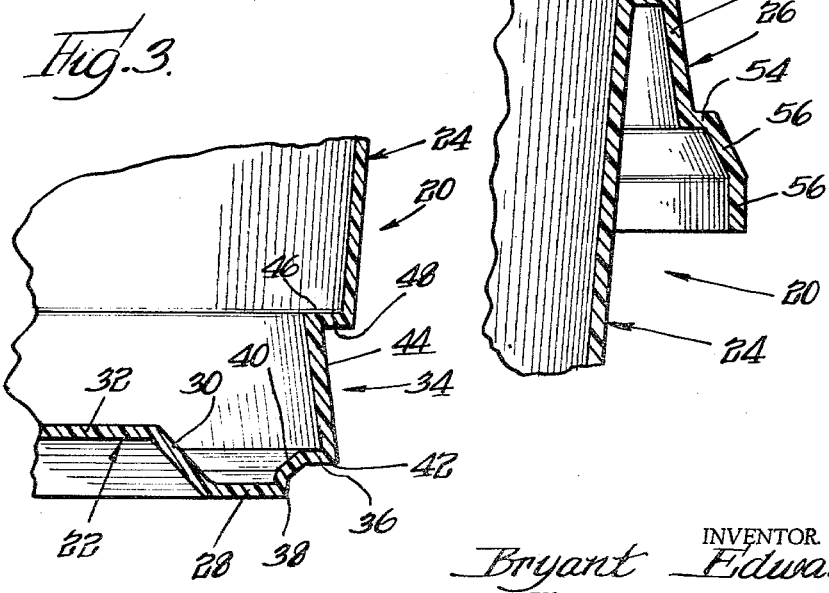
INVENTOR.
Bryant Edwards
BY Olson, Trexler,
Wolters & Bushnell atty.

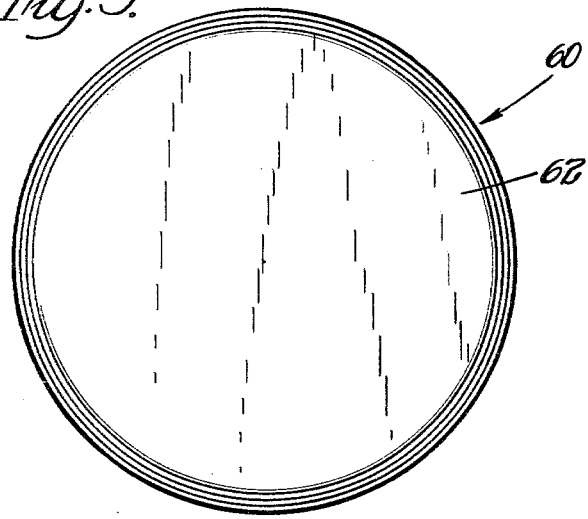
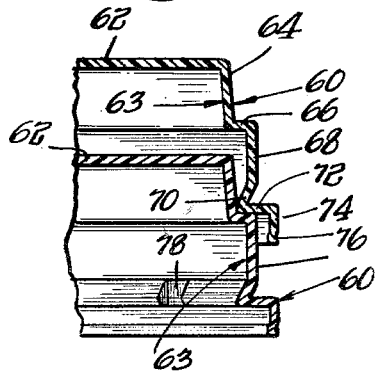
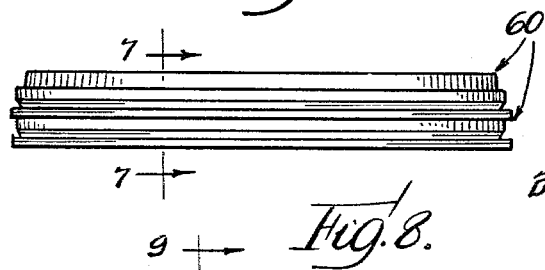
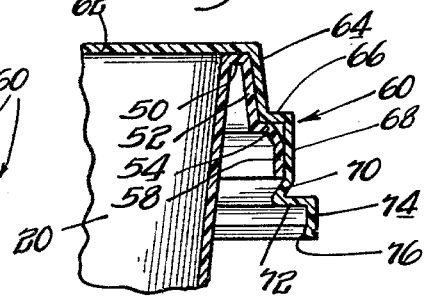
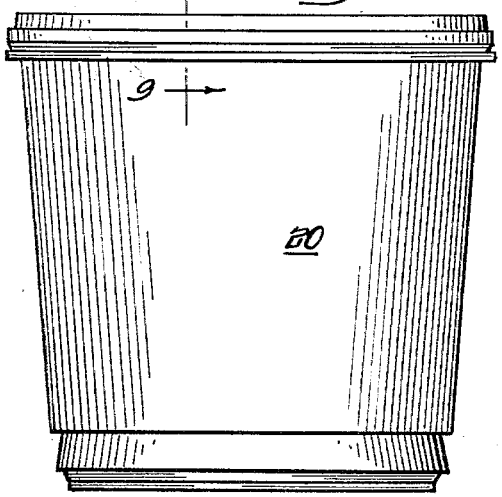
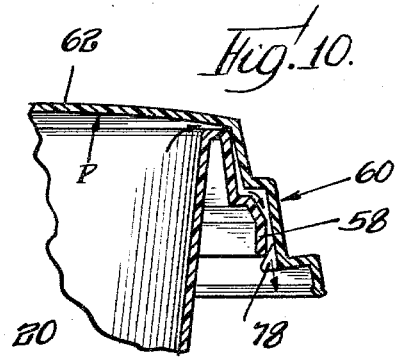

April 13, 1965    B. EDWARDS    3,178,051
CONTAINER AND LID
Filed Sept. 26, 1962    3 Sheets-Sheet 3
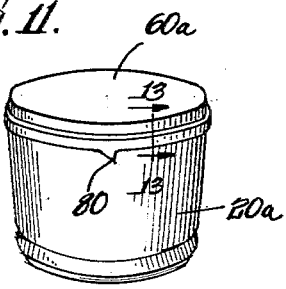
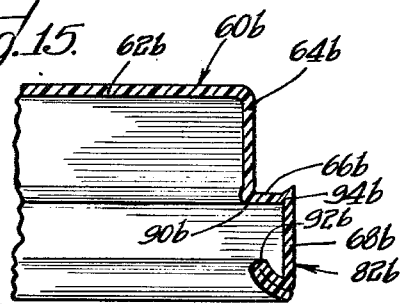
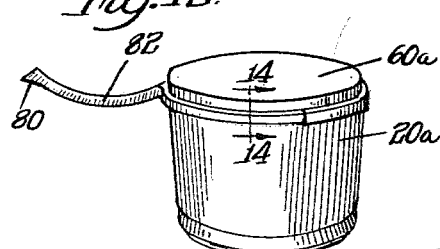
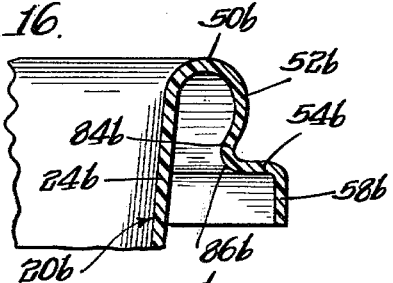
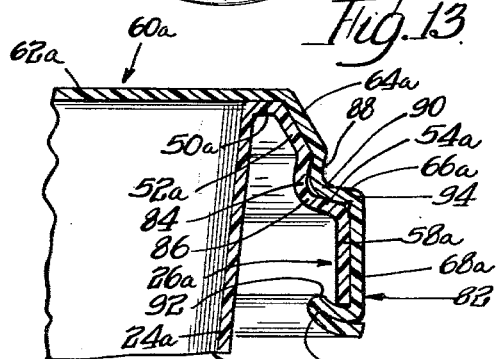
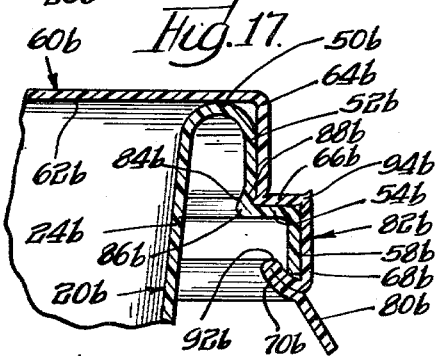
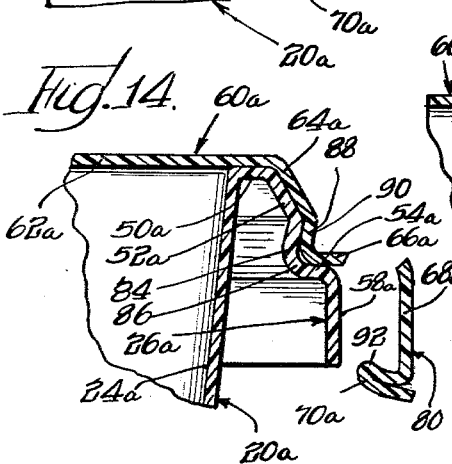
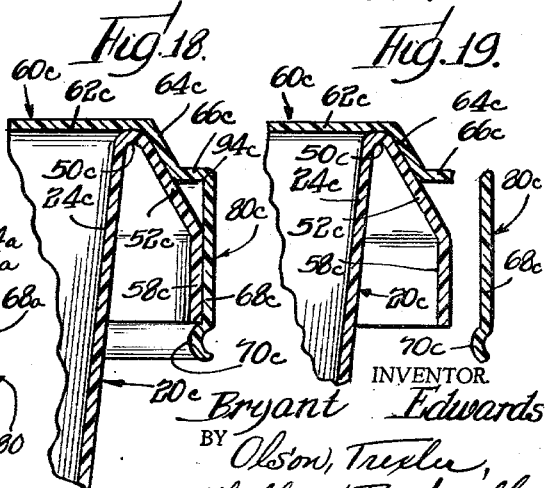
INVENTOR.
Bryant Edwards
BY Olson, Trexler,
Wolters & Bushnell United States Patent Office 3,178,051
Patented Apr. 13, 1965

3,178,051
CONTAINER AND LID
Bryant Edwards, Clarendon Hills, Ill., assignor to Illinois Tool Works Inc., Chicago, Ill., a corporation of Delaware
Filed Sept. 26, 1962, Ser. No. 226,333
7 Claims. (Cl. 220—60)

This invention relates to the container art, and more particularly to a plastic container for ice cream or the like.

For many years, it has been common practice to utilize paper or pasteboard cups or cartons for drinking purposes, and for the storage and sale of ice cream and various other products. The drawbacks and undesirable features of such containers are now rather well known. One prime defect resides in the inherent characteristics of such containers of being pervious to moisture. This allows seepage or leakage of products, and concomitant "poisoning" of the product to where it is unpalatable, frequently to the point of being useless. Similarly, some products dry out through loss of moisture.

Such paper containers have been heavily wax coated in an effort to make them moistureproof, but this has not proved entirely successful, due in part to the near impossibility of avoiding pinholes. Furthermore, at low temperatures, the wax coatings readily crack if the sides of the container are at all indented, as is almost inevitable in handling. Such indentation also frequently causes pieces of wax to be broken off and subsequently ingested. As will be understood, this is highly undesirable.

Paper cups and other containers also inherently lack resilience. This is particularly true if they have become at all penetrated by moisture. Hence, it is difficult to maintain proper sealing of closures thereon, and in the case of ice cream, cottage cheese and the like, this may be quite significant, as the container may be opened and closed many times before all of the contents are dispensed. The propensities for ice cream and cottage cheese and other dairy products to pick up unpalatable flavors if not properly protected is well known.

Accordingly, it is an object of this invention to provide a plastic container for ice cream and other products which avoids the prior art difficulties discussed above.

It is another object of this invention to provide a plastic container for ice cream and the like which has a tightly fitting cover which may be readily removed when desired.

It is yet another object of this invention to provide a plastic container for ice cream and the like having a tightly fitting cover which is readily removed, and which may be reinstalled with substantially as good a seal as before removal.

Still another object of this invention is to provide a plastic container for ice cream and the like, which container has an improved upper portion or lip for cooperation with a cover or lid.

Yet another object of this invention is to provide a container in accordance with the last preceding object, wherein the container is provisioned for stacking a plurality of such containers in telescoped relation with the lips out of engagement with one another, thereby avoiding any problems of entangling or of entrapment of air which would make separation difficult.

It is still a further object of this invention to provide a plastic container for ice cream and the like having improved means for stacking a plurality of such containers in telescoped relation and maintaining selected surfaces of such telescoped containers out of engagement to prevent abrading of printed material or the like thereon.

A further object of this invention is to provide a plastic container for ice cream and other dairy products which has a plastic lid forming a tight seal therewith, and yet which is self-venting for release of gases, in the case of dairy products such as cottage cheese and yogurt.

Another object of this invention is to provide a plastic container and lid for ice cream and like products wherein the lid is firmly retained in tamperproof sealing engagement, and is readily removable by means of a tear strip.

A further object of this invention is to provide a plastic container for ice cream and like products having a plastic lid sealed in place thereon and removable by means of a tear strip, wherein the lid subsequently is capable of re-sealing for continued storage of material which is not dispensed from the container upon initial opening thereof.

Other and further objects and advantages of the present invention will be apparent from the following description when taken in connection with the accompanying drawings wherein:

FIG. 1 is a side view of a plurality of containers constructed in accordance with the principles of the present invention, such containers being stacked in nested, telescoped relation;

FIG. 2 is an enlarged longitudinal sectional view through the containers of FIG. 1 substantially along the line 2—2 in FIG. 1;

FIG. 3 is an enlarged longitudinal sectional view through one of the containers of FIG. 1 as taken substantially along the line 3—3 in FIG. 1;

FIG. 4 is a view similar to FIG. 2 on a further enlarged scale, showing the lip of a single container;

FIG. 5 is a top view of a lid used in conjunction with the container;

FIG. 6 is a side view of a plurality of such lids in telescoped, stacked relation;

FIG. 7 is an enlarged longitudinal sectional view through the lids as taken substantially along the line 7—7 in FIG. 6;

FIG. 8 is a side view of a container with a lid thereon;

FIG. 9 is an enlarged longitudinal sectional view through the container and lid as taken substantially along the line 9—9 in FIG. 8;

FIG. 10 is a view similar to FIG. 9 illustrating the self-venting feature of the container and lid;

FIG. 11 is a perspective view of a modified form of the container and closure having a rip strip for removal of the closure member or lid;

FIG. 12 is a view similar to FIG. 11 showing the tear strip partially removed;

FIG. 13 is a view on an enlarged scale through the container and lid taken substantially along the line 13—13 in FIG. 11;

FIG. 14 is a similar longitudinal sectional view taken along the line 14—14 in FIG. 12 showing the closure and lid after removal of the tear strip;

FIG. 15 is an enlarged longitudinal sectional view through a modified form of cap;

FIG. 16 is a longitudinal sectional view on an enlarged scale through the upper portion of the container, showing a modified form of container;

FIG. 17 is a longitudinal sectional view showing the container of FIG. 16 with a closure member or lid thereon;

FIG. 18 is a longitudinal sectional view through the upper portion of the container and lid of modified construction and incorporating a tear strip; and FIG. 19 is a view similar to FIG. 18 subsequent to removal of the tear strip.

Considering that ice cream and the like containers are of a "throw-away" variety, it will be apparent that the cost thereof must be kept at a minimum. It is proposed in accordance with the present invention to provide a plastic container for this purpose, and in the interest of economy it is proposed to use a container molded from plastic sheet material, with the container having a finished thickness on the order of about one or two hundredths of an inch, a typical wall thickness in a commercial model being on the order of .015". Styrene based thermoplastics are preferred for manufacturing the containers of the present invention. Even when thin, this material is tough and resilient. However, it must be borne in mind that when the container is used for the storage of ice cream, it may be expected to be maintained at about 0° F. for extended periods. This tends to render the plastic material less resilient, and conversely more brittle and susceptible to fracture. This must be borne in mind in considering the disclosure of the present invention as hereinafter set forth.

A container constructed in accordance with the principles of the present invention is shown in FIGS. 1–4. The container, speaking broadly, is identified by the numeral 20 and comprises a bottom 22, a side wall 24 extending upwardly and preferably tapering outwardly from the bottom, and terminated at the upper edge by a reversely bent or inverted lip 26.

The bottom 22 is indented, and comprises a flat supporting ring section 28 having at its inner periphery a frustoconical section 30 extending to the indented flat central portion 32. The indentation of the central portion allows indicia, such as a date stamp for example, to be printed thereon without danger of its being rubbed or abraded away. As will be apparent, the frusto-conical configuration of the intermediate section 30 provides a strutting action between the ring 28 and the central portion 32, thereby improving the strength of the container.

The bottom portion of the side wall 24 comprises a stacking ring generally identified by the numeral 34. At the periphery of the ring 28 the side wall extends up in a small section at 36. This section is angled slightly outward, on the order of ten degrees. This makes the bottom corner 38 of the container an obtuse angle. Such an obtuse angle provides a far superior corner in that it is not difficult to maintain such a corner of uniform thickness, whereas a right angle or acute angle corner tends to thin out in sheet forming, thereby providing a weakened area. This angulation also has some advantage in positioning of successive, nested cups, as will be apparent hereinafter.

From the small portion 36, the side wall continues up and out as an angled portion 40 to a horizontal ring portion 42 forming an external shoulder with a ring 44 of reverse taper. The reverse tapered ring 44 forms an internal shoulder at 46 with a flat ring section 48 joined to the upwardly extending portion of the side wall 24.

When two or more cups are telescoped in nested relation as shown in FIG. 1, the angled portion 40 engages the internal shoulder 46 of a subjacent cup. The containers are thereby axially spaced a predetermined distance. The angled portion causes the inside container to centralize itself relative to the subjacent container, thereby preventing scuffing of the side walls against one another with consequent damage to printing which may be applied on the outside of the upper container. Such scuffing together also would cause an air lock rendering telescopic separation of the containers difficult. Furthermore, the angled portion allows a small amount of travel in a vertical direction between the containers acting as a shock absorber when a stack of containers is dropped, thereby preventing damage or jamming of the containers and also preventing bursting of a pasteboard carton in which such a stack of containers may be shipped.

The sidewalls extends up uniformly to the reversely directed lip or rim 26 of the container, which is rather sharply reentrant, having a radially extending wall 50 forming very nearly a right angle with the side wall 24. As will be observed the angle is slightly obtuse due to the preferred outward taper of the side wall. Furthermore, the bend is rounded slightly. The lip then continues down at 52 from the radial wall 50, tapering slightly outward as it descends. This again provides a slightly obtuse corner, and one which is rounded off slightly, as shown. The bottom portion of the upper tapered wall 52 is joined at another obtuse angle or corner to a horizontal ring portion 54, and this in turn is integrally joined to a frustoconical section 56 of greater taper angle than the upper wall portion 52. Finally, the lip is provided with a depending flange 58 integrally joined to the frustoconical portion 56 substantially vertical to the portion 52.

The sharp reverse bend at the upper portion of the lip as formed by the wall 50 and portion 52 reduces the stiffness of the lip in a radial direction. Hence, the lip may flex inwardly in a radial direction with particularly great facility, and can even flatten against the side of the cup without undue strain on the material. This prevents fracture of the lip, especially at the preferably zero degree temperature at which ice cream or other frozen foodstuffs are stored. Furthermore, such flexibility allows the lip of a container to conform to the contour of an out-of-round lid, and thereby provides an efficient seal with such a lid. Several portions of the lip provide sealing surfaces with a lid or closure member, as will be set forth hereinafter.

It will be apparent from a perusal of FIG. 2 that the lips of adjacent telescoped containers would tend to wedge very tightly together if they were brought into engagement. The stacking ring 34 prevents such engagement, and this is another advantage of the stacking ring. As will be observed, the total height of the lip 26 is less than the height of the stacking ring 34 and hence the cups are stacked in telescoped relation so that the lips do not overlap.

A cover, closure member or lid is shown in FIGS. 5–10, and is identified generally by the numeral 60. The lid comprises a flat top wall 62, and an integral depending peripheral skirt 63 comprising a tapered wall portion 64 having connected thereto a horizontal step or radially extending wall portion 66. An intermediate vertical wall portion 68 depends from the horizontal or radial wall portion 66, and is provided with an undercut or inwardly offset portion 70. The lip continues from the inwardly offset portion 70 as a horizontal or radially extending wall section, and subsequently a vertical depending flange 74 having an inwardly directed bead 76 along the lower edge thereof. The undercut or inwardly offset portion 70 is provided with circumferential interruptions 78 as best may be seen in FIGS. 7 and 10.

The tapered wall portion 64, as may be seen particularly in FIG. 7 provides a lead-in to act in stacking the lids on one another. That is to say, the tapered wall portion 64 of one lid cooperates with the undercut 70 of a lid immediately thereabove to aid in centralizing the lids relative to one another upon stacking in telescoped, nested relation for storage. The horizontal offset or wall 72 is particularly valuable in providing an area for a capping mechanism to engage to separate one lid from the bottom of a stack. The skirt 74 facilitates molding of the lid and adds vertical stiffness to the lip. Since the stepped portions provided by the horizontal or radial wall portions 66 and 72 are of rather small axial extent, the lid skirt, like the container lip, has a high degree of horizontal flexibility, thus reducing strain on the material when subjected to forces other than vertical. This reduces damage losses or breakage during handling and shipping, particularly at low temperatures.

When the lid is applied to the container as shown in FIG. 9, the lid is held on by the undercut 70 which snaps below the bottom flange 58 of the lid. The horizontal flexibility of both the lip and the lid depending skirt greatly simplifies both such assembly, and disassembly in permitting relative flexing of the lip and the skirt. Since the undercut has a tapered or cam-like upper, internal surface, it pulls the lid down so that the top 62 thereof is pressed firmly against the upper horizontal wall portion 50 of the lip, thereby insuring a proper sealing action at this location. A further seal occurs between the tapered depending portion, namely the portion 52 of the container lip, and the portion 64 of the lid skirt. Further sealing may also take place between the horizontal wall 66 of the lid skirt and the underlying horizontal wall portion 54 of the container lip, and also between the depending skirt 58 of the container lip and the vertical wall portion 68 of the lid skirt. All of these sealing engagements together are quite effective to prevent undesired leakage between the container and the lid, particularly of viscous products such as ice cream.

All of the horizontal surfaces 62, 66 and 72 may be used at one or more stages of a capping operation as reaction surfaces for the exertion of downward pressure by a capping machine.

Undesired gas pressure may sometimes be found beneath the lid of a container. For example, air may be trapped inside the container at the time it is applied. At other times, a pressure build-up inside the container may occur when the container is filled with a gas-producing product, such as cottage cheese or yogurt. An internal pressure as indicated by the letter P in FIG. 10 will force the top of the lid 60 upward, causing it to become convex upwards. This allows the undercut 70 to ride up the adjacent portion of the container skirt 58, due to the attendant camming action between the undercut 70 and the skirt 58. At the same time, the lid skirt is flexed slightly outward. As this occurs, gas is free to escape through the vent slots or discontinuities 78 as indicated by the arrows in FIG. 10. The pressure is thus relieved and the lid is allowed to resume its normal sealing position as shown in FIG. 9. The container lip and the lid thus act in combination as a one-way valve which is normally closed.

When it is desired to remove the lid from the container, the thumb or fingers may be pressed up beneath the bottom margin of the lid skirt, thereby deflecting it up in a localized region, much the same as in FIG. 10. As will be appreciated, the contined upward pressure in a localized region causes the undercut 70 to cam all of the way over the lowermost skirt portion of the container, thereby allowing the lid progressively to be removed from the container with considerable facility.

In some instances, it may be desirable to provide a more positive lock of the lid on the container. For example, it may be desired to assure the purchaser of various dairy products, particularly high grade ice cream, that the container has not been opened where it is displayed for sale. Accordingly, the embodiment of the invention in FIGS. 11-16 is provided. In this embodiment of the invention, the lowermost depending portion of the lid 60a is provided with a tab 80 leading into a tear strip 82 at the bottom portion of the lid. The lid is positively held in position until the tear strip is removed.

As may be seen particularly in FIGS. 13 and 14, most of the parts are similar to those heretofore shown and described, and similar numerals are used to identify similar parts with the addition of the suffix a. The distinguishing feature of the container lip 26a is that at the bottom of the tapered wall portion 52a, the lip is partially indented or undercut at 84, and then curves smoothly out therefrom at 86 to join a substantially horizontal portion 54a.

The depending skirt of the lid is shaped in somewhat complementary fashion. Specifically, the tapered wall portion 64a is provided with an undercut 88 curved smoothly back out at 90 to join the substantially horizontal portion 66a. The inward offset 70a at the bottom of the vertical wall portion 66a is not provided with an upwardly inclined cam surface, but rather with an upturned hook-like portion 92 which positively locks beneath the vertical skirt portion 58a of the container. The upturned nature of the inward offset 70a allows it to cam over the lip of the container during assembly therewith, as well as to provide a positive lock therewith after assembly. The material of the rib skirt is deliberately slightly crimped or thinned out at 94 at the junction of the horizontal portion 66a and the vertical skirt 68a, whereby the portion of the skirt below this thinned out portion 94 will readily tear away as the tear strip 82. As will be apparent, the sharp angle formed between the right side of the tear strip (FIG. 12) and the bottom portion thereof immediately adjacent thereto allows ready starting of a tear through the plastic material, thereby facilitating removal of the tear strip.

Due to the undercut nature of the container portion 84 and the corresponding lid portion 88, the lid may be snapped back on the container after initial removal. Thus, in the case of containers for ice cream and the like of such size that not all of the contents would be used upon initial opening, the lid can be re-installed in sealed position to maintain the remainder of the contents fresh.

A modification of the invention is shown in FIG. 15. This embodiment is quite similar to that in FIGS. 11-14 and similar numerals are used with the addition of the suffix b to identify like parts. Distinguishing features are found in the fact that the top portion 50b of the container lip is rounded over, rather than being flat, while the underlying lip portion 52b is also rounded, forming with the upper portion 50b a substantially continuous curve leading to the undercut portion 84b and 86b. The lid 60b, as shown in FIG. 15, and in FIG. 17 is not quite complementary to the container. The top 62b is flat out past the container lip portion 50b, and the wall 64b depending immediately therefrom is substantially vertical down to the undercut portion 88b, 90b. The inside diameter of the wall 64b is slightly less than the maximum outside diameter of the container lip wall portion 52b. Hence, when the lid is assembled with the container, the lip wall portion 52b is compressed to form a substantially straight wall as shown in FIG. 17, thereby providing a particularly efficient seal between the container and the lid.

The two embodiments of the invention as shown in FIGS. 11-17 contemplate the use of a tear strip to remove an initial total seal, but wherein the container and lid are so configured as to allow re-sealing. In some instances, such re-sealing may not be at all necessary, such as in the case of small ice cream cups in which it is intended that the entire contents should be consumed promptly upon opening of the container. In this instance, it is unnecessary and hence, undesirable to have the cooperating undercut portions, as these are more expensive to make, and to some extent make removal of the lid more difficult. Accordingly, the embodiment of FIGS. 18 and 19 is provided. In this embodiment, parts are similar to those shown and described heretofore and similar numerals are used for identification of like parts with the addition of the suffix c.

In FIGS. 18 and 19 the upper portion of the container lip 50c is simply shown as being rounded over, although whether this is rounded over or flat is not of particular importance in the present embodiment. The tapered or frusto-conical wall portion 52c extends down to the substantially vertical terminating skirt 86c, there being no offset or undercut portions in between. Similarly, the tapered wall portion 64c of the lid skirt extends direct to the horizontal or radially extending wall portion 66c with no intervening undercut portion. The internally projecting locking bead 70c is shown as somewhat smaller than the bead 70a, although this is not of particular importance. The thing that is important is well shown in FIG. 19, wherein it will be seen that once the tear strip 80c has been removed, the lid 60c simply rests on top of the container, with the wall portion 66c serving as a flange beneath which a finger may be placed to lift the lid.

It will now be seen that there has herein been disclosed a container and closure member therefor which is particularly well adapted to the merchandising of ice cream and other dairy products. The lid in each instance is initially firmly held in place, but is readily removable. In the embodiments of FIGS. 11-19, the lid cannot be removed without the tearing off of a tear strip therefrom, thereby insuring purity and freshness of the contents. Once the tear strip has been removed, the lid may still be snapped or locked in place in the embodiments of FIGS. 11-17.

As to the container per se, the lip at the upper edge is such as to impart strength to the container, and yet be flexible enough for ready cooperation with a lid or closure member. The stacking ring is such, coupled with the relation thereto of the lip of the container as to prevent entanglement of the lips of adjacent containers which are in stacked, nested, telescoped relation. In addition, the stacking ring spaces the containers a predetermined distance whereby to admit air for relatively facile separation of the containers. The angled portion at the bottom of each stacking ring centralizes containers relative to one another, and also provides a shock absorbing action. The spacing of the containers by the stacking rings prevents abrading of the surfaces, such as might wear off labels or the like printed thereon. The indented portion of the bottom of the container also provides an ideal place for the impression of a date stamp or the like, since this is a position which cannot be abraded to wear off indicia placed thereon.

Various embodiments of the invention have been shown herein, and it will be understood that these are for illustrative purposes. Various changes in structure will no doubt occur to those skilled in the art, and will be understood as forming a part of the invention insofar as they fall within the spirit and scope of the appended claims.

The invention is claimed as follows:

1. A thin-wall plastic container comprising a cup portion and a closure member therefor, said cup portion comprising a bottom, a circumferential side wall extending upwardly and outwardly therefrom to an open upper end, and a down-turned lip at the top of and outwardly disposed relative to said side wall adapted to receive said closure member, said lip being spaced from said side wall throughout its entire axial extent whereby to afford substantial radial flexing thereof toward said side wall during the application of said closure member to said down-turned lip and including first an upper margin extending radially out from said side wall at an obtuse angle thereto and then extending downwardly and outwardly to form an upper outer wall at an obtuse angle to said upper margin, said lip subsequently extending radially outwardly to provide an intermediate horizontal shelf at an obtuse angle to said upper outer wall and further having a downwardly and outwardly projecting depending skirt which terminates in an outer free extremity, said closure member in mounted position on said cup portion providing a top lying across and in engagement with the upper margin of said down-turned lip, said closure member further having a depending flange substantially conforming to and engaging all of the upper outer wall, said intermediate horizontal shelf, and the depending skirt of the down-turned lip whereby to provide a series of discrete, laterally offset sealing areas from the open upper end of said cup portion to the outer free extremity of its down-turned lip.

2. A thin-wall plastic container comprising a cup portion and a closure member therefor, said cup portion comprising a bottom, a circumferential side wall extending upwardly and outwardly therefrom to an open upper end, and a down-turned lip at the top of and outwardly disposed relative to said side wall adapted to receive said closure member, said down-turned lip extending radially out from said side wall as an upper margin and then extending downwardly as an upper outer wall and subsequently out again as an intermediate shelf and further having a depending skirt terminating in an outer free extremity, said down-turned lip being spaced from said side wall throughout its entire axial height whereby the juncture between the upper margin and the upper outer wall serves as a fulcrum point in permitting substantial radial flexing thereof toward said side wall during the application of said closure member to said down-turned lip, said closure member comprising a top lying across and in engagement with the upper margin of said down-turned lip and having a depending skirt substantially conforming to all of said upper outer wall, said intermediate shelf and the depending skirt of said down-turned lip, and locking means for releasably and positively securing said closure member to said down-turned lip and thereby position the complementary surfaces of said cup portion and closure member into engagement with each other to provide a series of discrete, laterally offset sealing areas from the open upper end of said cup portion to the outer free extremity of its down-turned lip, said locking means including an undercut portion provided on the depending skirt of said closure member and extending beneath at least a portion of the down-turned lip for retaining the closure member on the cup portion.

3. A container as set forth in claim 2 wherein said locking means also includes an undercut portion provided on the down-turned lip of said cup portion, the undercut portions on the down-turned lip and depending skirt of said cup portion and closure member respectively being received within one another to hold the closure member on said cup portion.

4. A container as set forth in claim 2 wherein the closure member undercut portion has an inwardly and upwardly facing cam surface permitting the closure member to be pulled up off of said cup portion.

5. A container as set forth in claim 2 wherein the portion of the closure member depending skirt carrying the undercut portion is arranged as a tear strip for releasing the closure member from the cup portion.

6. A container as set forth in claim 2 wherein the depending skirt of said closure member further is provided with a tear strip having an inward projection underlying the outer free extremity of said cup portion down-turned lip and serving as a second locking means retaining the closure member on said cup portion until said tear strip is torn off.

7. A container as set forth in claim 2 wherein said side wall is provided with a stacking ring having lower external supporting means and upper internal supporting means, the lower external supporting means of one cup portion being engageable with the upper internal supporting means of a subjacent cup portion to support a plurality of cup portions in telescoped, nested, stacked relation with the lips and bottoms of adjacent cup portions free of one another.

References Cited by the Examiner
UNITED STATES PATENTS

| | | | |
|---|---|---|---|
| 2,535,840 | 12/50 | Coyle | 220—60 |
| 2,711,840 | 6/55 | Gits | 220—42 |
| 2,790,576 | 4/57 | Lawrence | 220—42 |
| 2,922,563 | 1/60 | Aldington | 229—43 |
| 3,061,139 | 10/62 | Edwards | 220—60 |
| 3,065,875 | 11/62 | Negoro | 229—43 |
| 3,091,360 | 5/63 | Edwards | 220—97 |
| 3,094,240 | 6/63 | Wanderer | 220—97 |
| 3,104,045 | 9/63 | Buchini | 229—43 |

THERON E. CONDON, *Primary Examiner.*

EARLE J. DRUMMOND, *Examiner.*